United States Patent [19]

Mengeu et al.

[11] Patent Number: 5,388,731
[45] Date of Patent: Feb. 14, 1995

[54] CAP AND DISPENSING FITMENT COMBINATION WHEREIN THE CAP HAS RETAINING MEANS ENGAGING THE FITMENT

[75] Inventors: Gary L. Mengeu, Wheeling, W. Va.; Herbert V. Dutt, Sarasota, Fla; Douglas R. Ziegler, Cambridge, Ohio

[73] Assignee: Continental Plastics, Inc., Triadelphia, W. Va.

[21] Appl. No.: 58,351

[22] Filed: May 4, 1993

[51] Int. Cl.⁶ .............................................. B65D 47/00
[52] U.S. Cl. ...................................... 222/545; 215/277; 220/256; 222/563; 222/568
[58] Field of Search ............... 222/545, 546, 563, 568, 222/570; 215/277, 350, 351; 220/256

[56] References Cited

U.S. PATENT DOCUMENTS

| | | | |
|---|---|---|---|
| 2,547,590 | 4/1951 | McGinnis | 215/277 X |
| 2,696,318 | 12/1954 | Kihm | 215/277 |
| 3,339,772 | 9/1967 | Miller | 215/277 |
| 3,765,578 | 10/1973 | Stull | 222/546 |
| 3,823,841 | 7/1974 | Lovejoy | 215/277 X |
| 4,076,152 | 2/1978 | Mumford | 215/350 X |
| 4,187,964 | 2/1980 | Bogart | 222/547 X |
| 4,196,819 | 4/1980 | Fontanaud | 222/568 X |
| 4,438,800 | 2/1984 | Owens | 222/547 |
| 4,475,274 | 10/1984 | Beckstrom et al. | 222/545 X |
| 4,494,682 | 1/1985 | Beckstrom et al. | 222/551 |
| 4,564,117 | 1/1986 | Herbert | 215/351 X |
| 4,717,034 | 1/1988 | Mumford | 215/318 |
| 4,773,552 | 9/1988 | Boege et al. | 215/247 |
| 4,961,521 | 10/1990 | Eckman | 222/545 |
| 4,993,606 | 2/1990 | Bolen, Jr. et al. | 222/546 |
| 5,111,978 | 5/1992 | Mengeu | 222/545 |
| 5,183,171 | 2/1993 | Pherigo | 215/277 X |

Primary Examiner—Andres Kashnikow
Assistant Examiner—Joseph A. Kaufman
Attorney, Agent, or Firm—R. V. Westerhoff; David V. Radack

[57] ABSTRACT

A cap and dispensing fitment combination for a container. The cap has an end wall and a skirt extending axially from the periphery of the end wall, the cap being adapted to engage the neck of the container. The end wall of the cap has an annular flange that extends axially and radially outwardly therefrom, the annular flange terminating in a free end surface that facilitates securing the dispensing fitment to the cap. The dispensing fitment comprises an end wall having at least one opening therein, the annular flange engaging into the opening. The dispensing fitment has a sidewall extending axially from the periphery of the end wall and is adapted to engage the container when the combination is placed on the container and to retain the dispensing fitment on the container even as the cap is removed from the container.

10 Claims, 8 Drawing Sheets

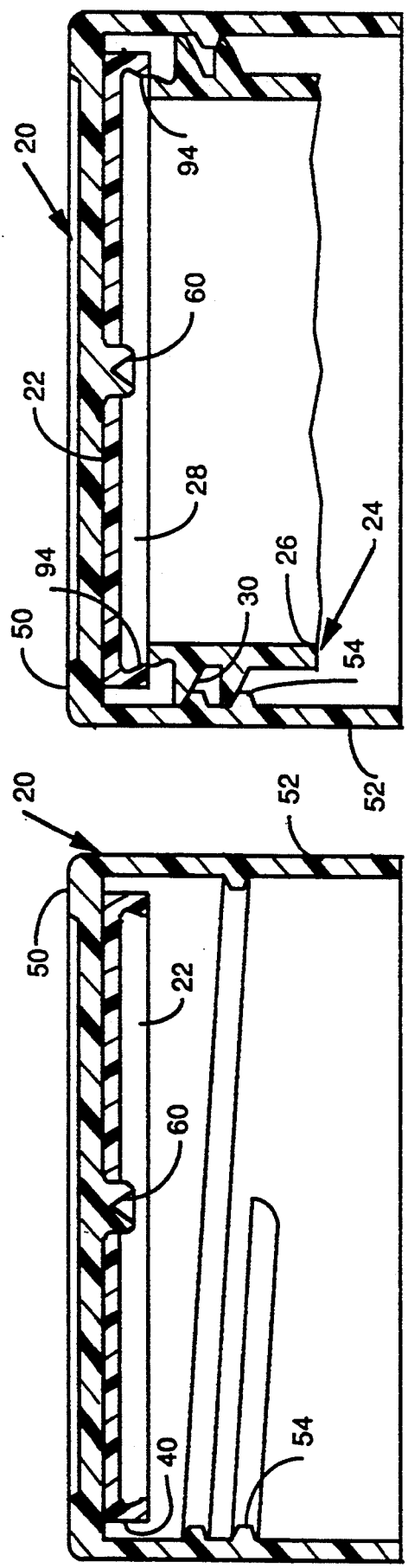
FIG. 10
FIG. 11A
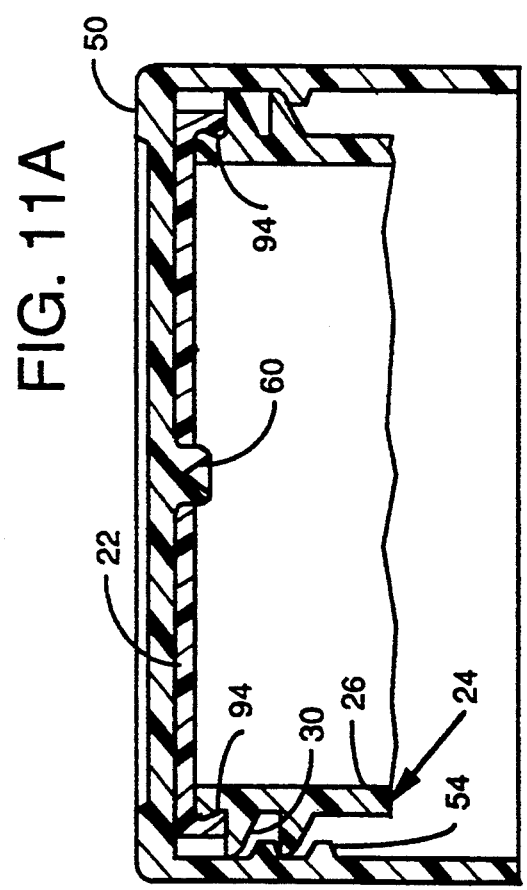
FIG. 11B

CAP AND DISPENSING FITMENT COMBINATION WHEREIN THE CAP HAS RETAINING MEANS ENGAGING THE FITMENT

BACKGROUND

1. Field Of The Invention

This invention is directed to a cap and dispensing fitment wherein the dispensing fitment is retained in the cap until applied to a container, but which then remains secured to the container for dispensing the contents of the container when the cap is removed.

2. Background Information

Many containers are provided with fitments for dispensing the contents of the containers. These fitments may have variously configured openings such as a single aperture for dispensing drops of liquid from the container, a slot for pouring, or a plurality of apertures for shaking out liquid or granular product from the container.

Typically, the fitment snaps into engagement with the container opening and a removable cap is applied over the fitment for sealing the container for shipment and between uses. Conventionally, separate operations have been required to install the fitment and then the cap on the filled container.

In order to eliminate the necessity for two distinct assembly steps, fitment-closure combinations have been developed in which the fitment is temporarily retained within the closure so that they may be applied to the container as an assembly in one operation. For example, U.S. Pat. No. 4,187,964 shows a combined closure cap and pour out fitment. The closure cap has a circular sealing plug which frictionally engages and seals the pour spout or aperture in the pour out fitment. Similarly, U.S. Pat. No. 3,339,772 shows a container cap which has a downwardly extending protuberance which fits into a spout closure.

Experience has shown, however, that in the prior art combinations, the fitment is not adequately secured in the closure to withstand shocks which may occur during shipment and in the capping operation. Often the assemblies are dumped into a bin and subject to other forms of rough handling such as transport by a pneumatic system, vibratory feeding and mechanical indexing all of which tend to dislodge the fitment from the closure. On the other hand, the fitment cannot be retained too tightly in the closure since it must separate from the closure when secured to the container.

There remains a need, therefore, for a cap and dispensing fitment combination in which the dispensing fitment is retained securely in the cap until such time as the cap is separated from the dispensing fitment when the dispensing fitment is secured to the container neck.

SUMMARY OF THE INVENTION

The invention has met the above-described need. The cap and dispensing fitment combination for a container comprises a cap having an end wall and a skirt extending axially from the periphery of the end wall, the cap being adapted to engage the neck of the container. The end wall of the cap has retaining means extending axially and radially outwardly therefrom, the retaining means terminating in a free end surface which facilitates securing the dispensing fitment to the cap. The dispensing fitment comprises an end wall having at least one opening therein, the retaining means engaging into the opening. The dispensing fitment has a sidewall extending axially from the periphery of the end wall and container engagement means on the sidewall to secure the dispensing fitment to the container when the combination is placed on the container and to retain the dispensing fitment on the container even as the cap is removed from the container.

BRIEF DESCRIPTION OF THE DRAWINGS

A full understanding of the invention can be gained from the following description of the preferred embodiment when read in conjunction with the accompanying drawings in which:

FIG. 10 is a vertical section through the cap and fitment showing the fitment retained in the cap in accordance with the invention.

FIG. 11A is a vertical section showing the cap and fitment combination before it is screwed completely down on the container.

FIG. 11B is a vertical section showing the cap and fitment combination after it is screwed completely down on the container.

DESCRIPTION OF THE PREFERRED EMBODIMENTS

Figure 1:
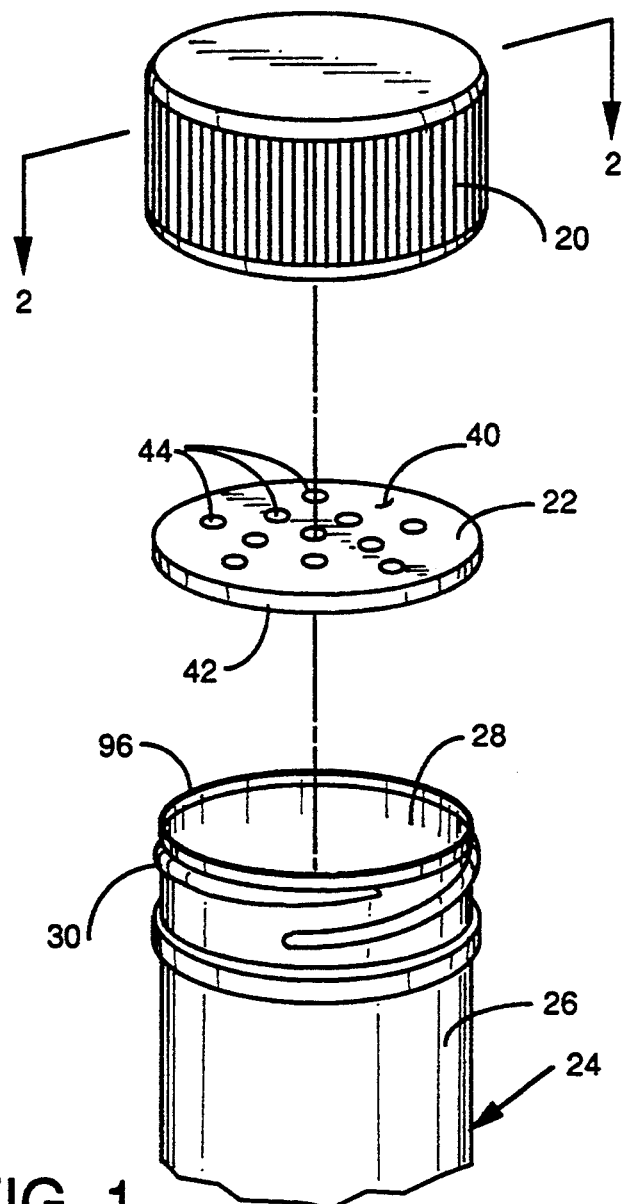
FIG. 1 is an exploded perspective view showing the cap, the dispensing fitment and a container.

Referring to FIG. 1, the cap 20 and fitment 22 are shown in disassembled form and also shown in relation to a container 24 on which the cap and fitment combination can be placed. The container 24 has a neck 26 that defines a container opening 28. The container neck 26 includes a single external screw thread 30 which is adapted to be engaged by complementary threads (not shown in FIG. 1) on the cap 20 and also includes a fitment securement means 96 to accept the fitment 22.

The fitment 22 has an end wall 40 and a cylindrical sidewall 42 extending axially from the periphery of the end wall 40. The end wall 40 has a plurality of dispensing openings 44 through which product in the container 24 can be dispensed. Other types of dispensing openings other than dispensing openings 44 can be provided in the end wall 40, such as, for example, one small opening for dispensing a liquid a drop at a time.

The cap 20 and fitment 22 are preferably made of plastic and are formed by an injection molding process which will be discussed in detail with reference to FIGS. 4–6. Although the cap 20, fitment 22 and container opening 28 are shown as being circular it will be appreciated that the invention is not so limited, and other shapes can be used.

Figure 2:
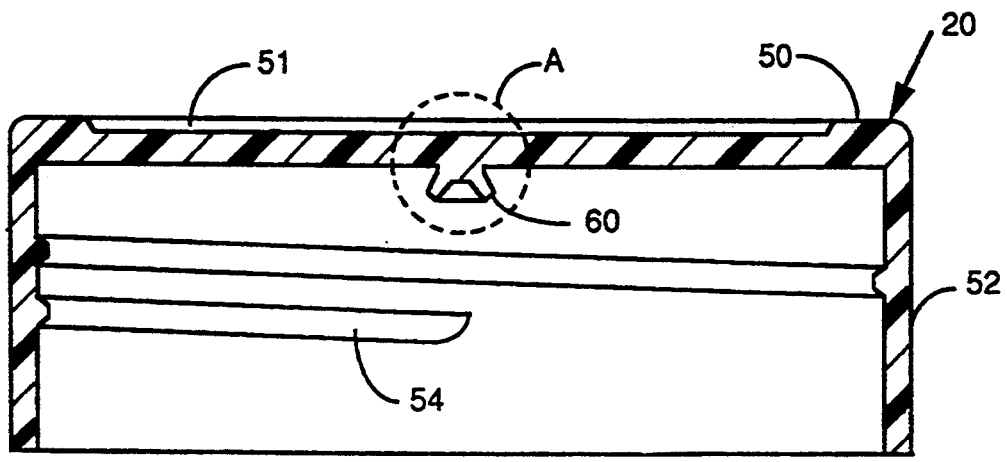
FIG. 2 is a cross-sectional view taken along line 2—2 of FIG. 1.

Referring now to FIG. 2, the cap 20 consists of circular end wall 50 defining a stacking recess 51 and having a cylindrical skirt 52 extending axially from the periphery of the end wall 50. An internal screw thread 54 is provided which is adapted to engage the external screw thread 30 on the container neck 26. It will be appreciated however, that the invention is not limited to a screw cap, and that other means of securing the cap to the container are contemplated by the invention.

Extending axially and radially outwardly from the end wall 50 is retaining means 60. As can best be seen in FIG. 3, the retaining means 60 consists of an annular flange having an outer surface 62 and inner surface 64 and terminating in a free end surface 66. A portion 68 of the retaining means 60 adjacent to under surface 70 of the end wall 50 is generally perpendicular to the end wall 50, however the outer surface 62 and the inner surface 64 are angularly disposed in reference to the longitudinal axis C of the annular flange.

Figure 3:
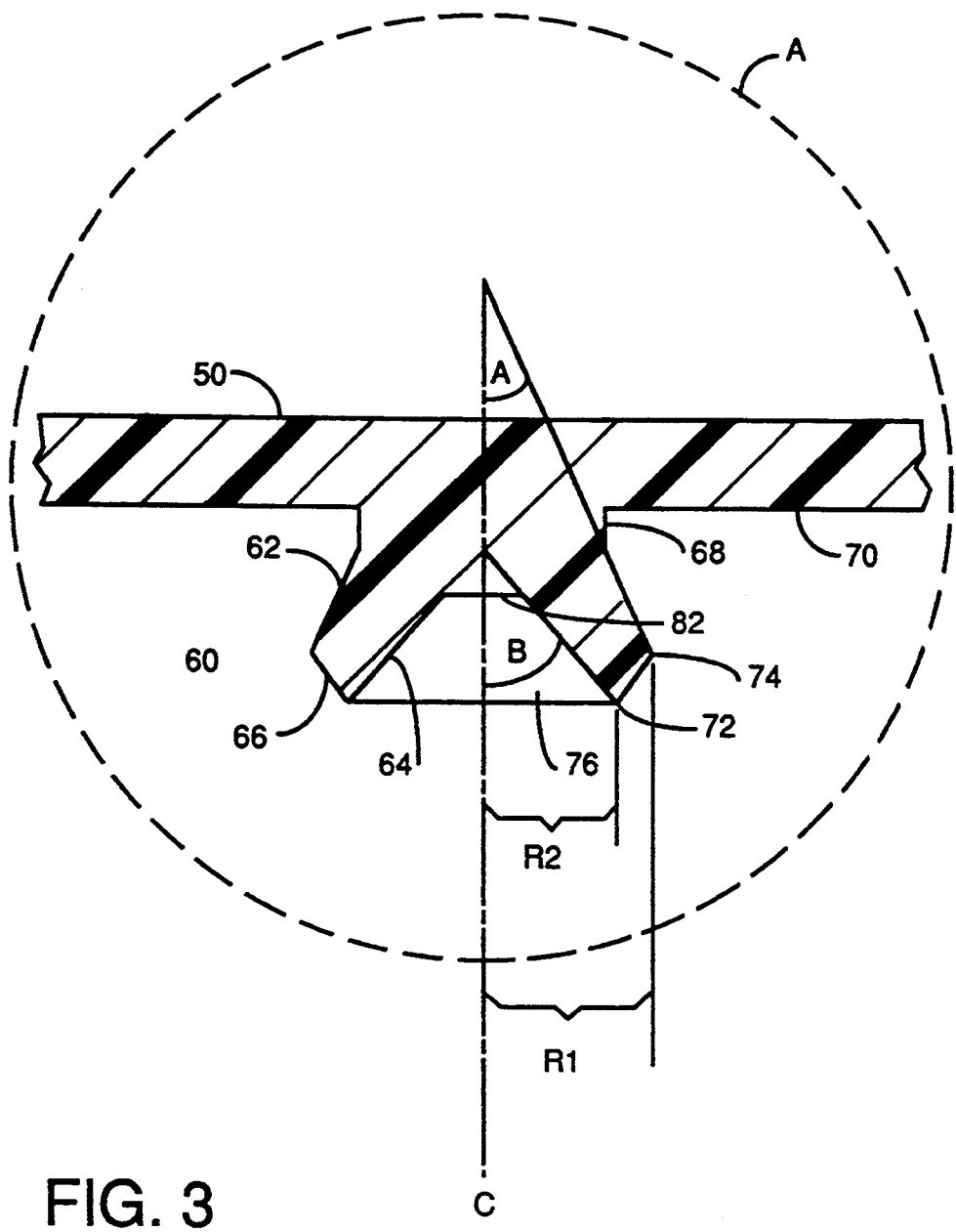
FIG. 3 is a view of Detail A of FIG. 2 showing the retaining means.

The angle A formed by the outer surface 62 and the longitudinal axis C is shown in FIG. 3 as being about 23° and the angle B formed by the inner surface 64 and the longitudinal axis C is shown as being about 49°. The angle B formed by the inner surface 64 and the longitudinal axis C must be larger than the angle A formed by the outer surface. The significance of these angle measurements will be discussed fully hereinafter with respect to FIGS. 4–6.

Still referring to FIG. 3, it will be seen that the free end surface 66 is bevelled and tapers from a first circumferential edge 72 formed at the intersection of the inner surface 64 and the free end surface 66 to a second circumferential edge 74 formed at the intersection of the outer surface 62 and the free end surface 66. As can also be seen from FIG. 3, the radius R1 from a point on the longitudinal axis C to the second circumferential edge 74 is greater than the radius R2 from the longitudinal axis C to the first circumferential edge 72. In addition, the annular flange defines a relief area 76. The relief area 76 is defined by the inner surface 64 and a planar surface 82.

Figure 4:
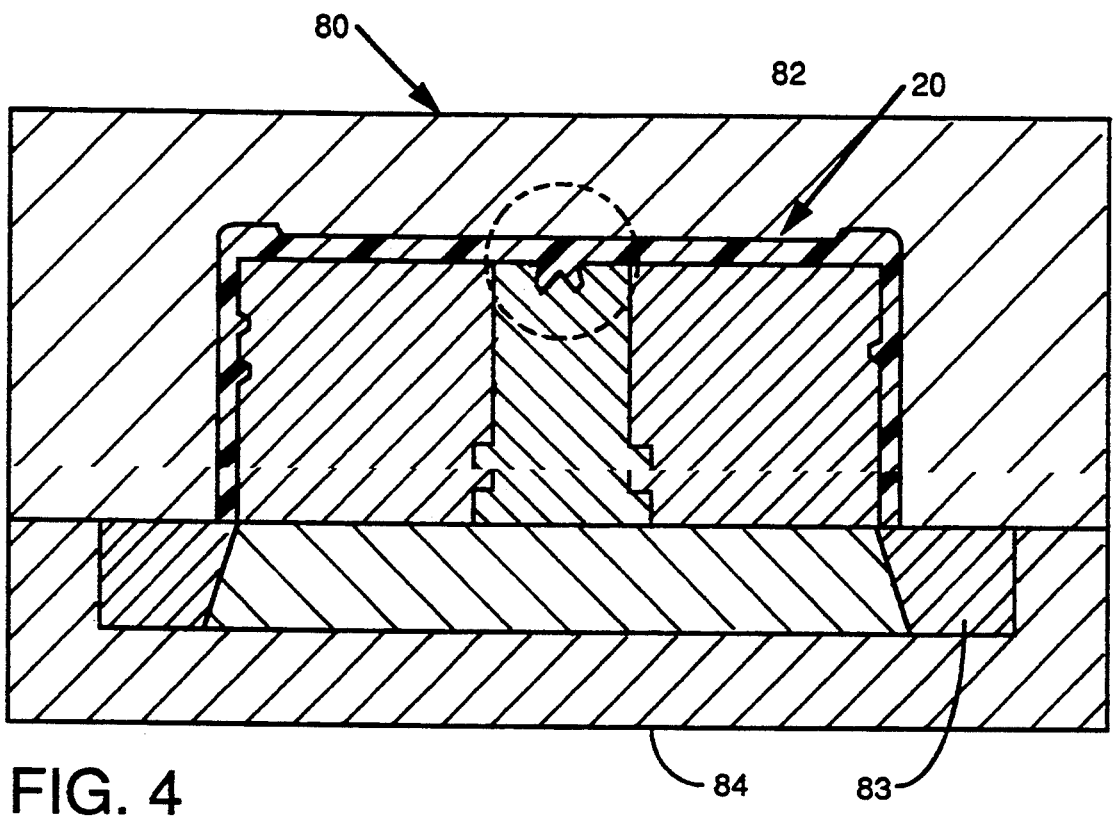
FIG. 4 is a vertical section showing the cap of the invention after it is formed in a mold and before the mold is opened.
Figure 4A:
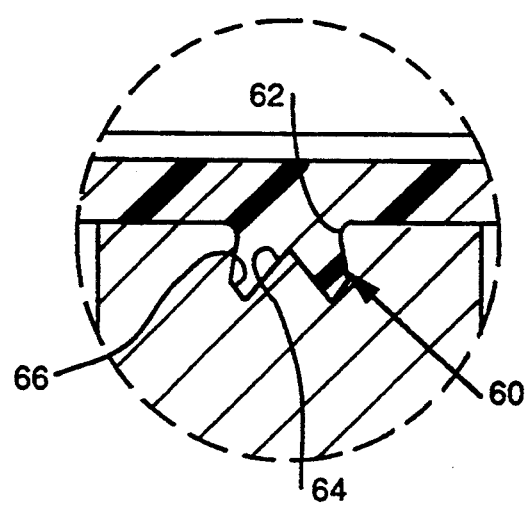
FIG. 4A is a detailed view of the retaining means shown in FIG. 4.
Figure 5:
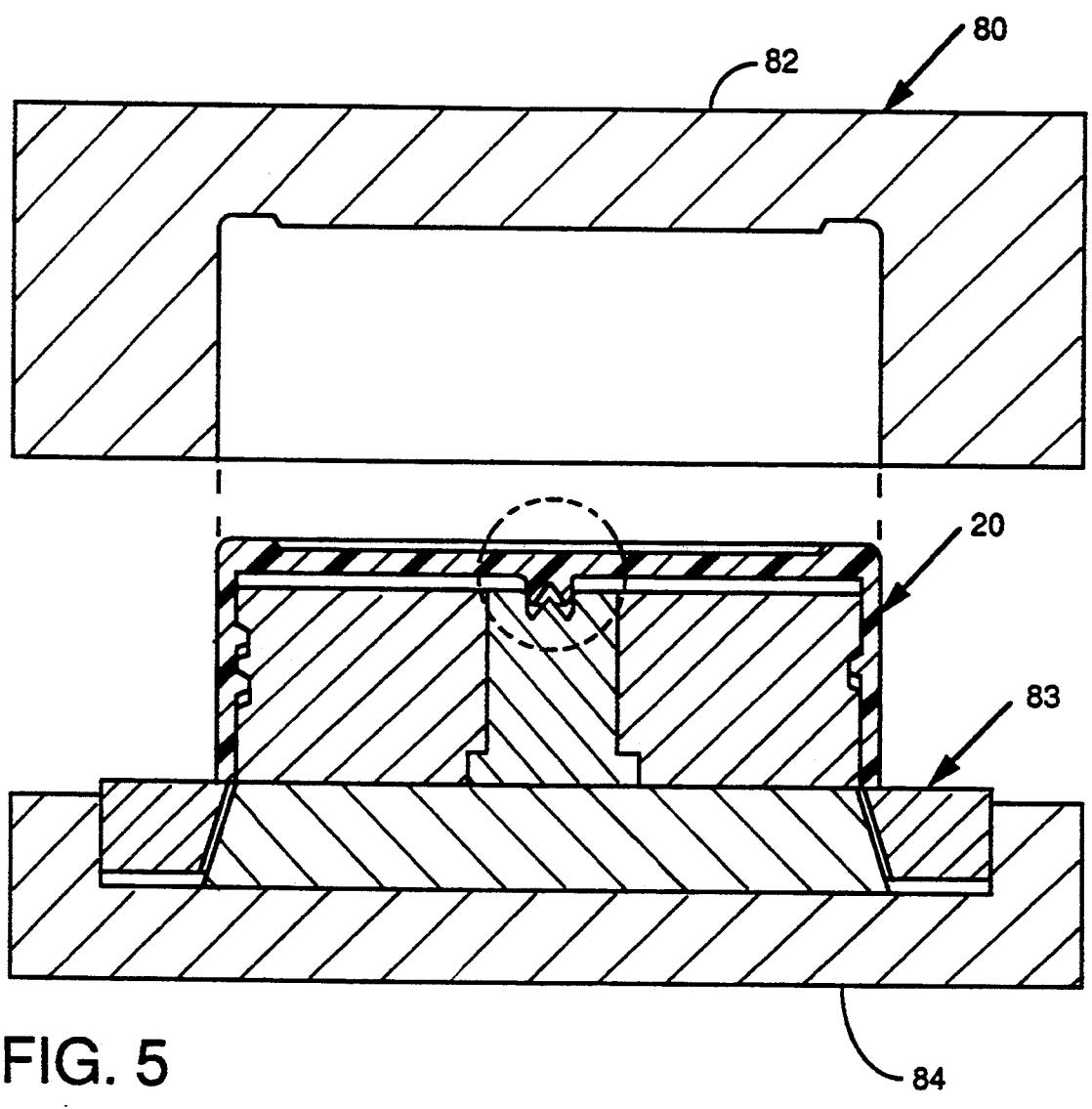
FIG. 5 is a vertical section showing the cap as the mold begins to open and the cap begins to eject from the mold.
Figure 5A:
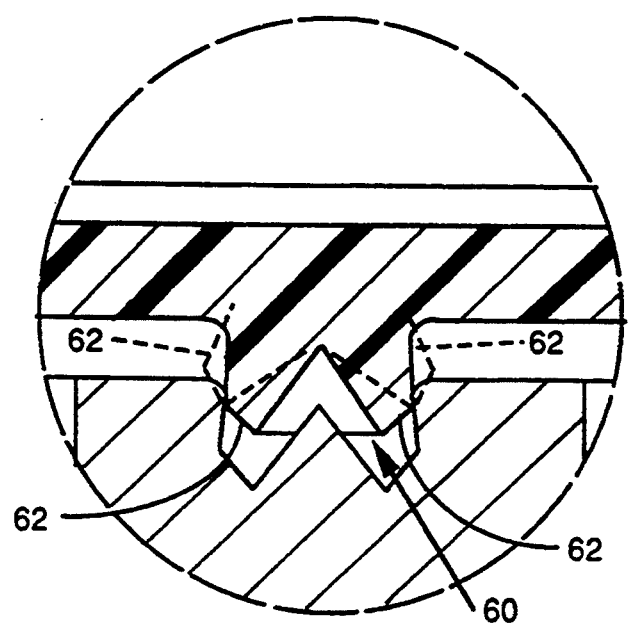
FIG. 5A is a detailed view of the retaining means shown in FIG. 5.
Figure 6:
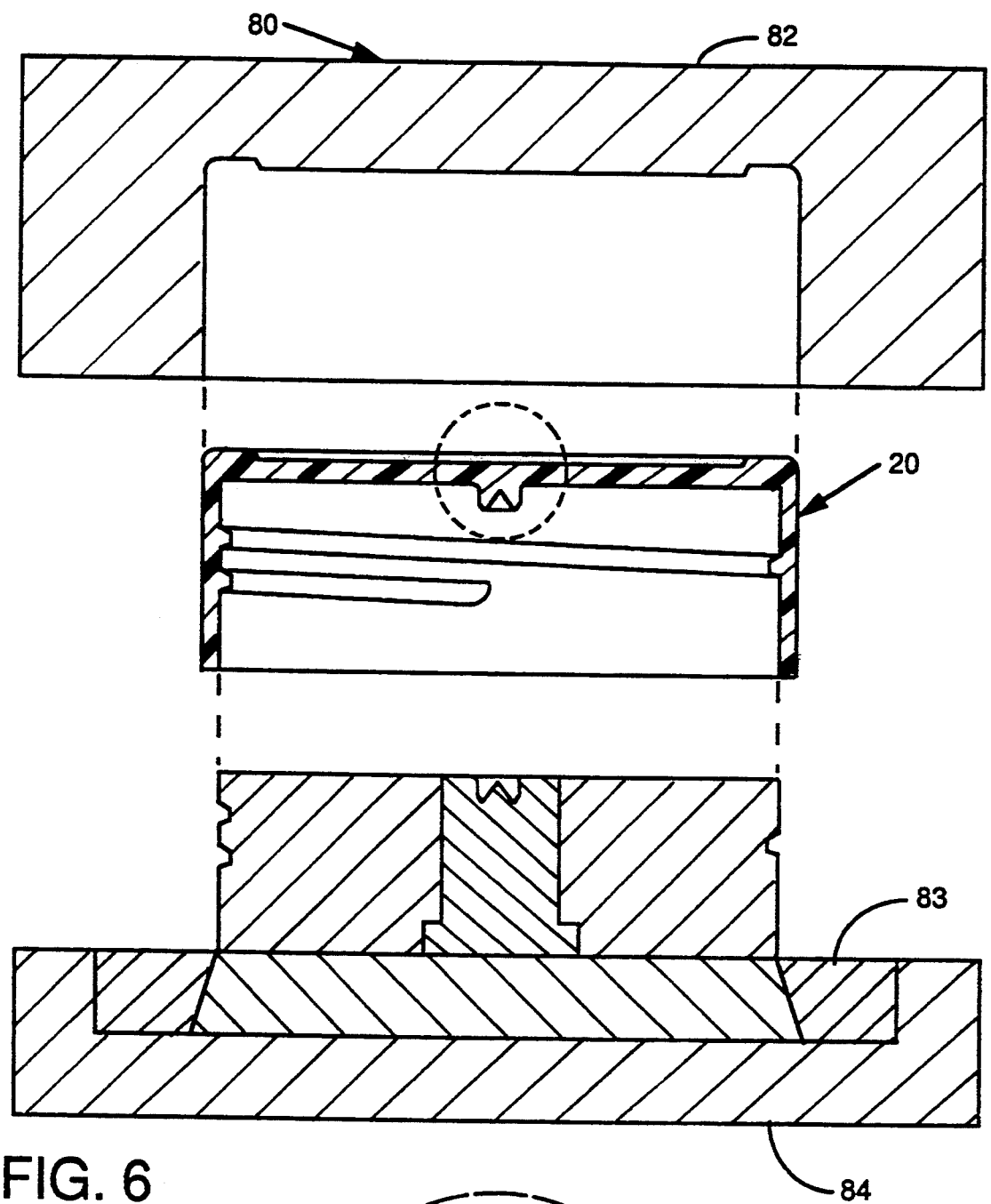
FIG. 6 is a vertical section showing the cap after it is ejected from the mold.
Figure 6A:
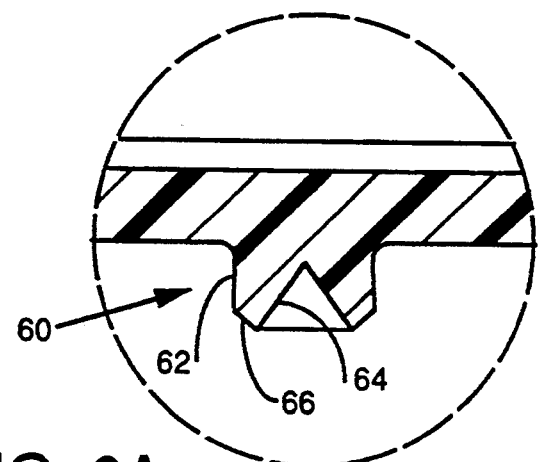
FIG. 6A is a detailed view of the retaining means shown in FIG. 6.

Referring now to FIGS. 4–6, a time lapse sequence is shown illustrating how the cap 20 is formed. FIG. 4 shows the portion of the cap 20 including the retaining means 60 just after the plastic has been injected into a mold 80. The mold 80 consists of a stationary mold half 82, a stripper ring 83 and a moving mold half 84. The mold is typically made of steel and is installed in a conventional injection molding machine (not shown). Once all of the plastic has been injected into the mold and has solidified, the stripper ring 83 and moving mold half 84 are withdrawn from the stationary mold half 82 and are also separated from the cap 20 as is shown in FIG. 5. As this happens, the moving mold half 84 will exert pressure on the outer surface 62 of the retaining means 60 as can best be seen in FIG. 5A. However, due to the resilient nature and configuration of the retaining means 60, the retaining means 60 bends inwardly from its original position as shown in phantom in FIG. 5A to the position shown in solid lines in FIG. 5A. Once moving mold half 84 is completely clear of the retaining means as shown in FIGS. 6 and 6A, the retaining means 60 will snap back into its original molded shape.

The retaining means 60 can be formed by the injection molding process because of the resiliency of the retaining means 60 but mostly because of the configuration of the retaining means 60 and the cooperation between the cap 20 and the fitment 22, particularly the retaining means 60 and the dispensing opening 44a (which will be discussed further with respect to FIG. 7). Referring back to FIG. 3, angle A is less than angle B. This allows the retaining means 60 to bend inwardly, as shown in FIG. 5, into relief area 76 (FIG. 3). We have found that preferably, angle A can be about 6° to 23° and angle B can be about 38° to 48°. We have found that the angles A and B allow successful molding of the retaining means 60 and allow removing the retaining means 60 intact from the mold.

Although the retaining means 60 is shown as a continuous annular flange, it will be appreciated that sections of the retaining means 60 can be removed, thus creating segments which together make up the retaining means 60.

Figure 7:
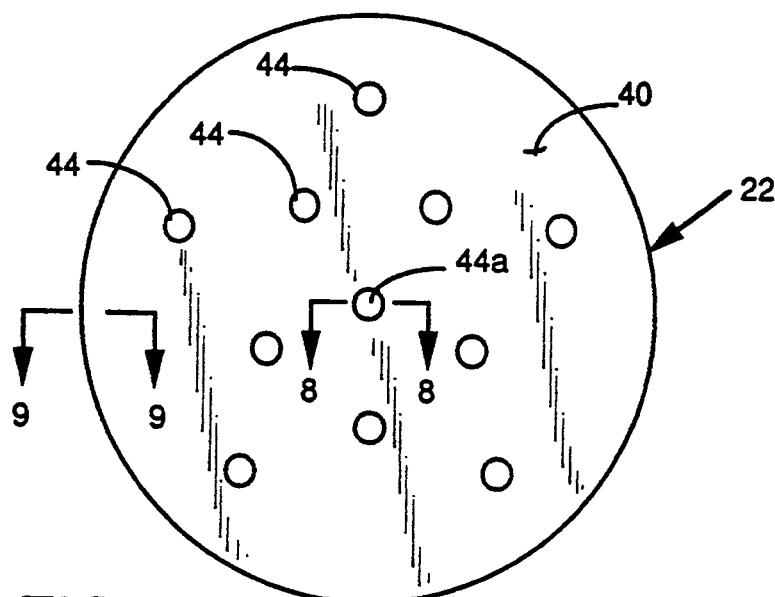
FIG. 7 is a top plan view of the dispensing fitment.
Figure 8:
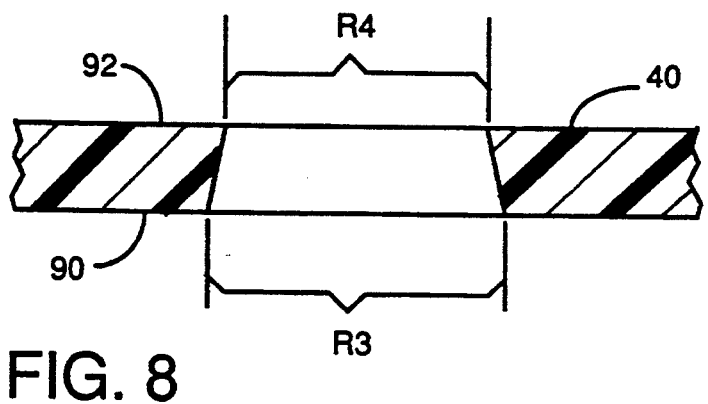
FIG. 8 is a cross-sectional view taken along line 8—8 of FIG. 7.

Referring now to FIG. 7, the fitment 22 having end wall 40 is shown. The fitment 22 has eleven dispensing openings 44 arranged in a "star pattern". This fitment 22 can be used for containers holding product that is shaken from the container 24, such as spices. A dispensing opening 44a is positioned in the center of the end wall 40 and is the opening that engages the retaining means 60, as will be explained in FIG. 9. As can be seen in FIG. 8 the opening tapers from a radius R3 on the lower surface 90 of the end wall 40 to a smaller radius R4 on the upper surface 92 of the end wall 40. The upper surface 92 will face the lower surface of the end wall 50 of the cap 20 when the cap 20 and fitment 22 are assembled.

Figure 9:
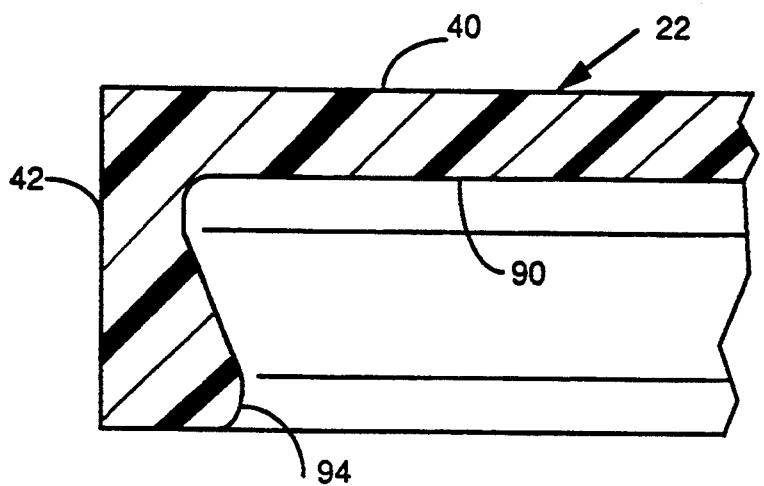
FIG. 9 is a cross-sectional view taken along line 9—9 of FIG. 7.

FIG. 9 shows the container engagement means 94 of the fitment 22. The container engagement means 94 consists of a radially inwardly projecting portion of the cylindrical side wall 42 of the fitment 22.

Referring now to FIG. 10, the cap 20 and fitment 22 combination is shown in cross-section. The fitment 22 securely engages the cap 20 merely by pressing the fitment 22 in the cap 20. When the fitment 22 is first brought into contact with the free end surface 66, and subsequently pressed on the retaining means 60, the configuration of the free end surface 66 causes the opening 44a to stretch, thus allowing it to clear the circumferential edge 74 and radius R1 (FIG. 3). It will be appreciated that this is necessary because both radius R3 and R4 of the dispensing opening 44a (See FIG. 8) are smaller than radius R1, but are larger than radius R2 (FIG. 3). For example, radius R1 can be preferably from 0.065 to 0.073 inches and more preferably, from 0.067 to 0.069 inches and radius R2 can be preferably from 0.031 to 0.063 inches and more preferably from 0.047 to 0.049 inches. Radius R3 and radius R4 depend on the dimensions of radius R1 and R2 and are configured to securely mate with the retaining means 60. For example, if radius R1 is 0.068 and radius R2 is 0.048, radius R3 can be 0.066 and radius R4 can be 0.062. This configuration allows the fitment 22 to engage the retaining means 60 securely. In addition, as can be seen in FIG. 10, the tapered opening 44a is adapted to be complementary to the outer surface 62 of the retaining means 60 so that the fitment 22 and the retaining means 60 are maintained in intimate surface-to-surface contact when the fitment 22 is assembled with the cap 20 as shown in FIG. 10.

FIGS. 11A and 11B show the cap 20 and fitment 22 combination as it is screwed onto the neck 26 of the container 24. The container engagement means 94 is pushed down over fitment securement means 96 on the mouth of the container 24 as is shown in FIGS. 11A and 11B. In this way, the cap 20 and fitment 22 assembly can be shipped to the end user as one piece and applied to the container 24 by standard processes. The ultimate consumer of the product merely unscrews the cap 20 and the fitment 22 remains secured to the open mouth of the container by virtue of the engagement of container engagement means 94 of the fitment 22 with fitment engagement means 96 of the container 24. This procedure also results in a "popping noise" when the retaining means 60 of the cap 20 separates from the fitment 22. This can be used by the ultimate consumer as an indication that no tampering has occurred with the product contained in container 20.

It will be appreciated that the fitment can be designed to be secured to the inside of the container mouth as opposed to being secured to the outside of the container mouth as shown in FIGS. 11A and 11B. The inside fitment and its relationship to the container is shown in U.S. Pat. No. 5,065,908 which is hereby incorporated by reference herein.

Figure 12:
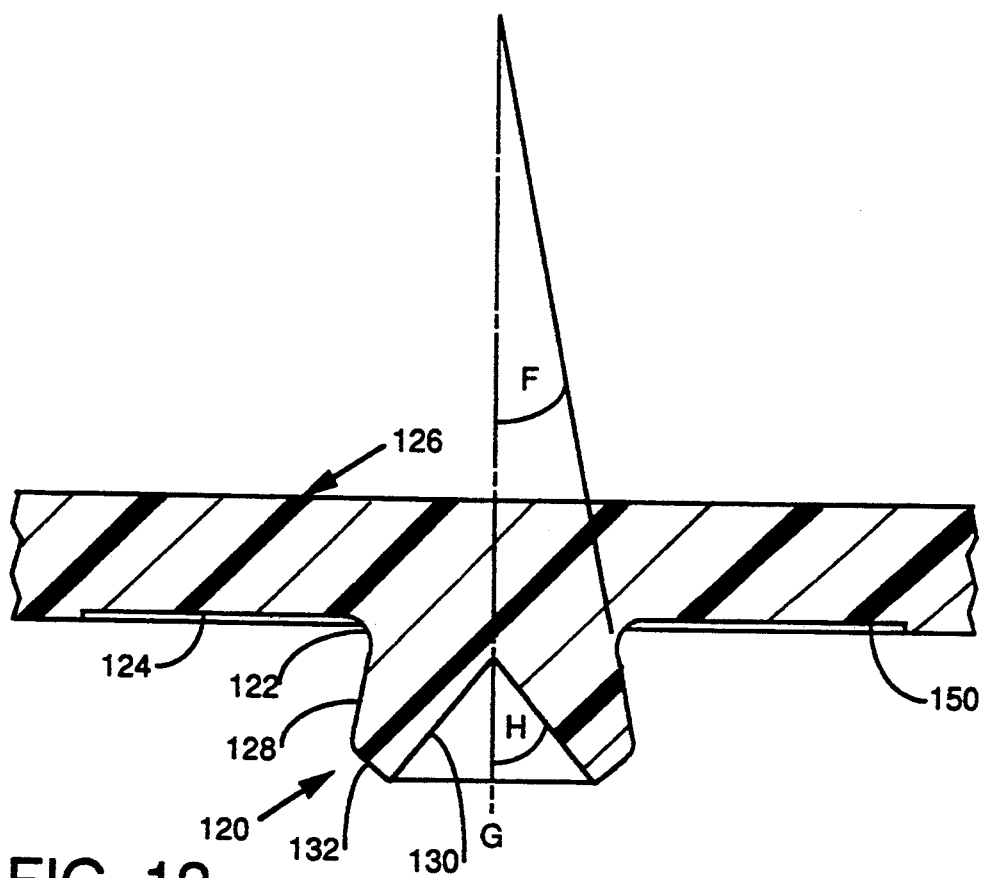
FIG. 12 is a vertical section of another embodiment of the retaining means.
Figure 13:
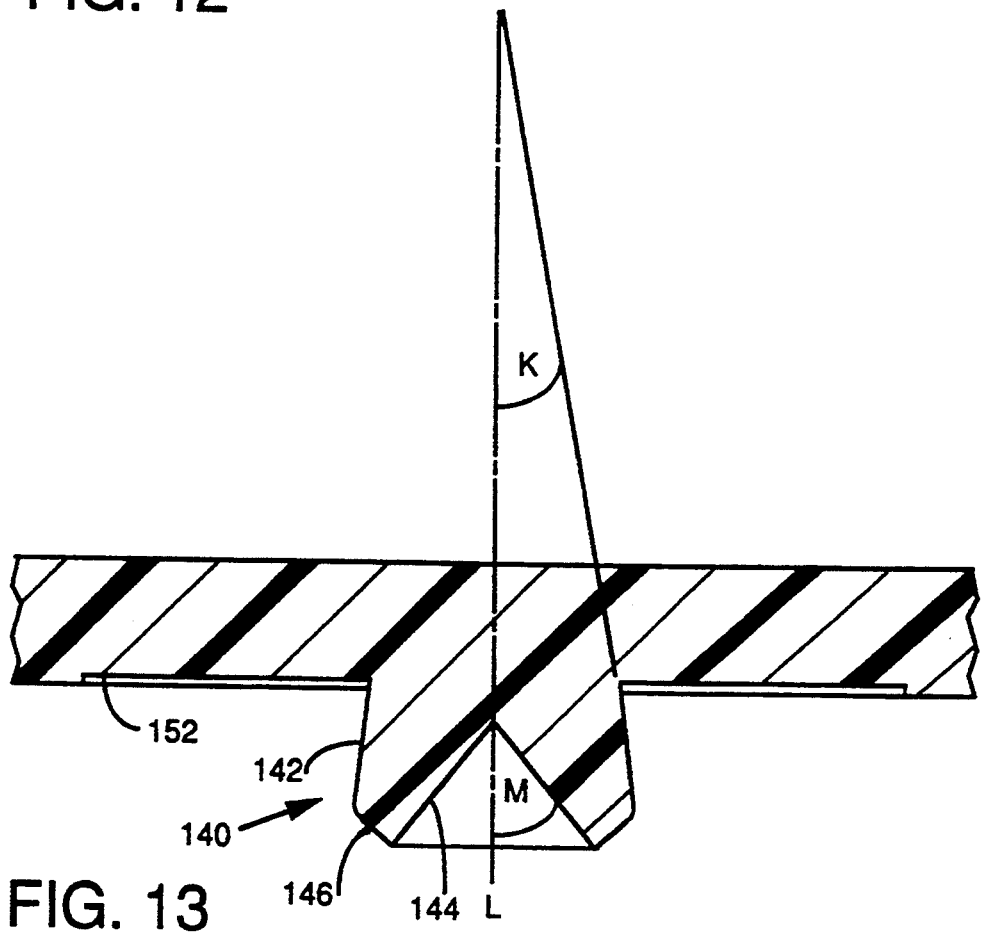
FIG. 13 is a vertical section of yet another embodiment of the retaining means.

Referring now to FIGS. 12 and 13, two alternate embodiments of the retaining means of the invention are shown. FIG. 12 shows a retaining means 120 having a rounded portion 122 formed between the under surface 124 of the cap 126 and the outer surface 128 of the retaining means 120 annular flange. FIG. 12 also shows that the angle F made by the outer surface 128 and the longitudinal axis G of the retaining means 60 is about 6° and the angle H made by the inner surface 130 of the retaining means and the longitudinal axis G of the retaining means 60 is about 41°. FIG. 12 also shows a free end surface 132.

FIG. 13 shows yet another embodiment of the retaining means 140. This embodiment has an outer surface 142 which forms an angle K of about 10° with the longitudinal axis L of the retaining means 140. The inner surface 144 forms an angle M of about 41° with the longitudinal axis L of the retaining means 140. A free end surface 146 is also provided. FIGS. 12 and 13 show a recess 150 and 152, respectively, formed in the under surface of the cap end walls. This recess, although not required, is about 0.005 to 0.015 inches.

It will be appreciated that a cap and fitment combination in accordance with the invention has been disclosed. While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A cap and dispensing fitment combination for use on a container having a neck defining a container opening and having cap engagement means and fitment securement means, said combination comprising:
   a cap having an end wall and a skirt extending axially from the periphery of said end wall, said cap having means for engaging said cap engagement means and a flange extending axially and radially outwardly from said end wall and terminating in a free end surface which facilitates securement of said dispensing fitment to said cap; and
   a dispensing fitment comprising an end wall having at least one opening therein, said flange engaging into said opening, said dispensing fitment including a sidewall extending axially from the periphery of said end wall and container engagement means on said sidewall to secure said dispensing fitment to said fitment securement means of said container when said cap is placed on said container and to retain said dispensing fitment on said container even as said cap is removed from said container.

2. The combination of claim 1, wherein
   said flange is an axially and radially outwardly extending annular flange having an inner surface and an outer surface.

3. The combination of claim 2, wherein
   said inner surface and the longitudinal axis of said annular flange define a first angle and said outer surface and the longitudinal axis of said annular flange define a second angle; and
   said first angle is greater than said second angle.

4. The combination of claim 3, wherein
   said free end surface is bevelled.

5. The combination of claim 4, wherein
   said free end surface intersects said outer surface at a first circumferential edge which has a first radius and said free end surface intersects said inner surface at a second circumferential edge which has a second radius which is smaller than said first radius; and
   said free end surface tapers from said first circumferential edge to said second circumferential edge.

6. The combination of claim 5, wherein
   said opening in said dispensing fitment has a radius that is less than said first radius and greater than said second radius.

7. The combination of claim 2, wherein
   said annular flange has a portion adjacent to said circular end wall that is generally perpendicular to said circular end wall.

8. The combination of claim 1, wherein
   said opening is circular.

9. The combination of claim 8, wherein
   said dispensing fitment has a first surface facing said end wall of said cap and a second surface opposite said first surface; and
   said opening is frusto-conical, having a smaller radius at said first surface than at said second surface.

10. The combination of claim 3, wherein
    said second angle is between 6° and 23°.

* * * * *